A. H. REAM.
SIDE GRIPPING CHUCK FOR LATHES OR BORING MILLS.
APPLICATION FILED OCT. 15, 1912.
1,064,539.
Patented June 10, 1913.
2 SHEETS—SHEET 2.
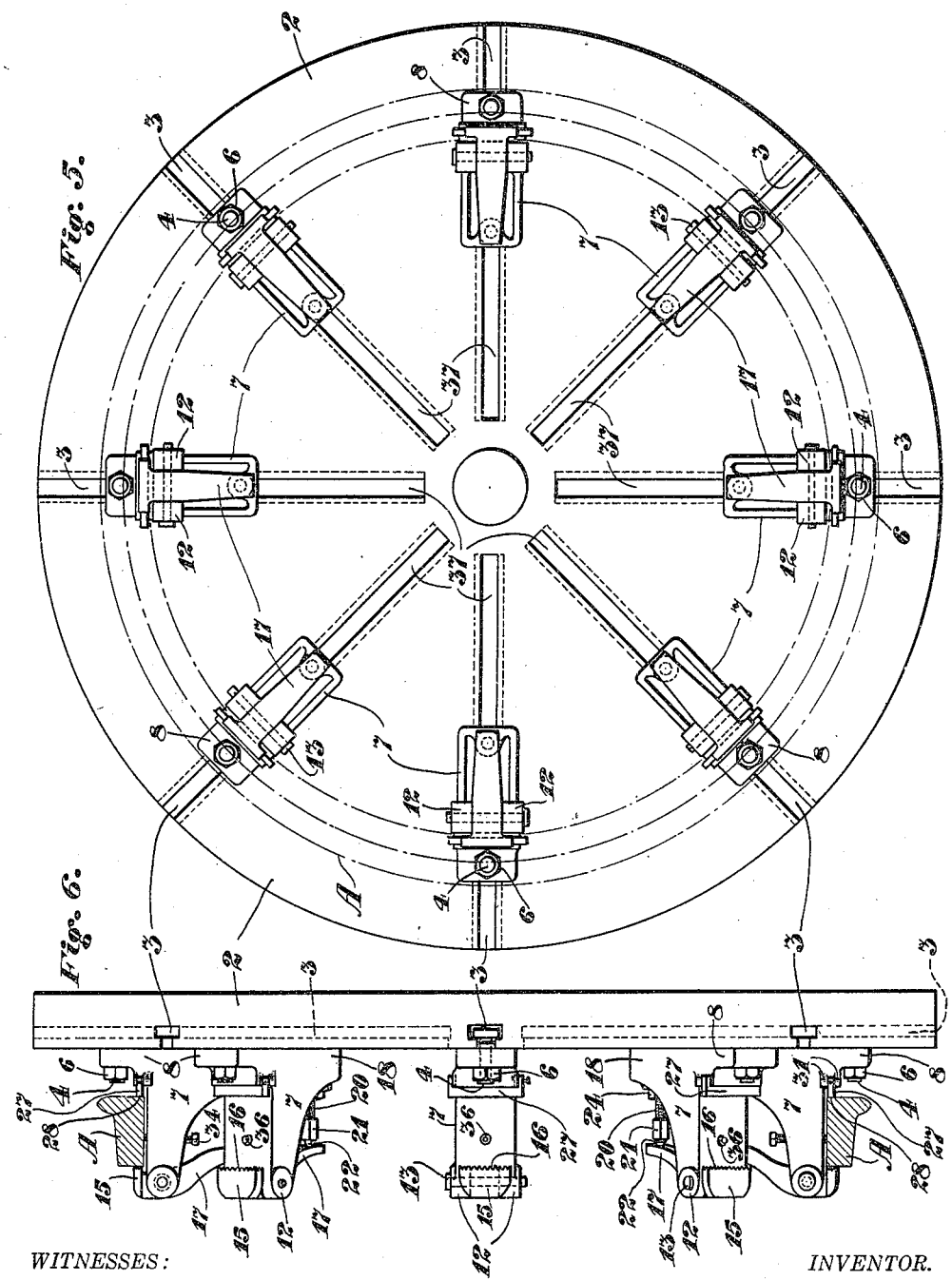
WITNESSES:
INVENTOR.

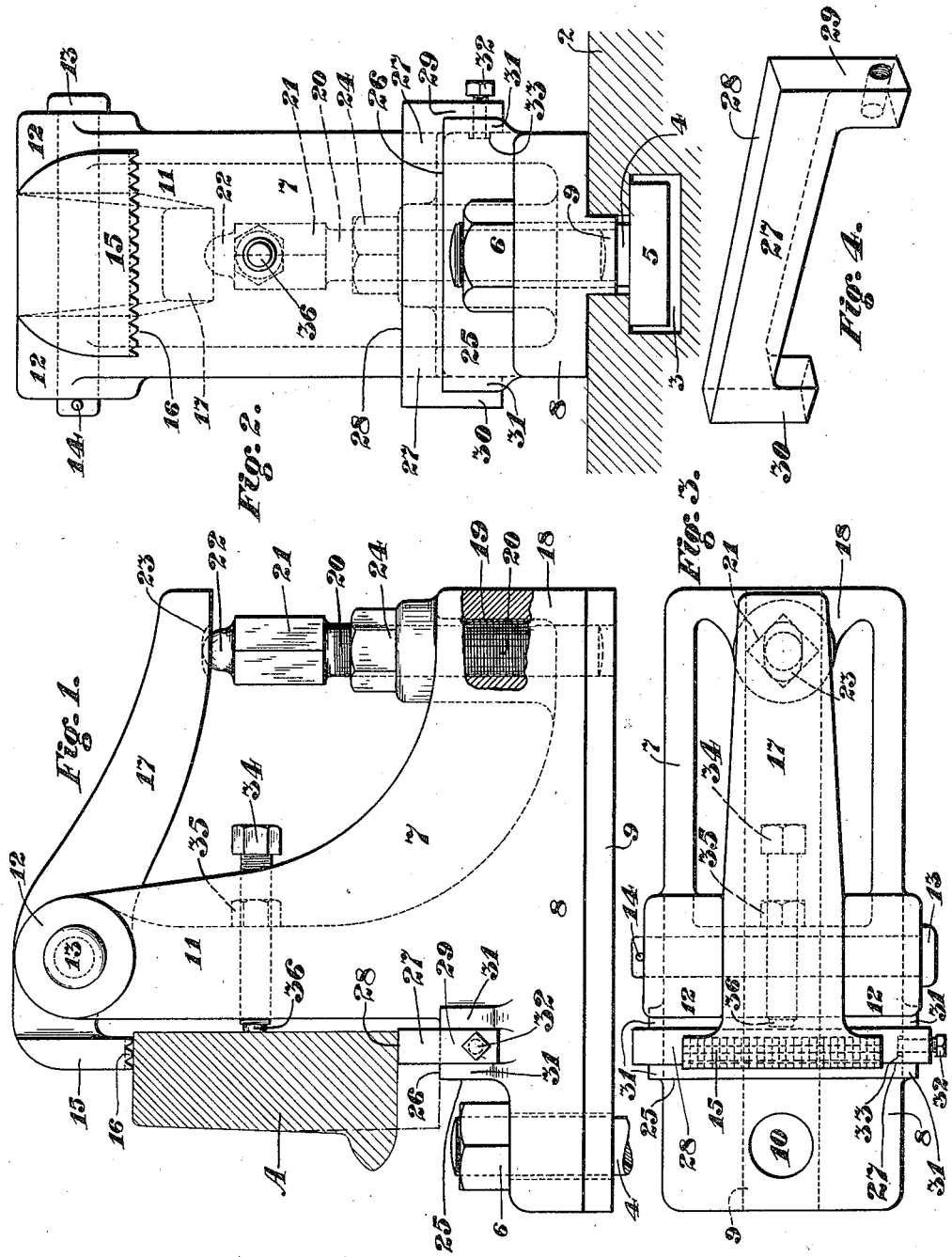

UNITED STATES PATENT OFFICE.

AUSTON H. REAM, OF VERONA, PENNSYLVANIA.

SIDE-GRIPPING CHUCK FOR LATHES OR BORING-MILLS.

1,064,539.

Specification of Letters Patent. Patented June 10, 1913.

Application filed October 15, 1912. Serial No. 725,777.

*To all whom it may concern:*

Be it known that I, AUSTON H. REAM, a citizen of the United States, residing at Verona, in the county of Allegheny and State of Pennsylvania, have invented certain new and useful Improvements in Side-Gripping Chucks for Lathes or Boring-Mills, of which the following is a specification.

My invention relates to the class of boring mills or lathes and is especially designed to provide an improved gripping chuck for a wheel tire, being particularly adapted to the turning of the tires of locomotive or other similar wheels.

The invention has in view to provide a chuck which may be readily applied to the face-plate of an ordinary lathe or boring mill, for such work, and to operate by gripping the sides of the tire at different points around its circumferential side faces to rigidly hold it in position on the face-plate for turning.

The device is applicable to the turning of the tread of the tire, or by reversal of the chucks, to hold the tire in a similar manner for boring the interior.

One preferred form of the invention is illustrated in the accompanying drawings in which—

Figure 1 is a view of one of the chucks in side elevation, showing it in operative position to the tire for turning the face and flange. Fig. 2 is a view of the chuck in end elevation, a portion of the face-plate being shown in section. Fig. 3 is a plan view of Fig. 1. Fig. 4 is a perspective detail view of one of the inner bearing shoes. Fig. 5 is a face view, illustrating the application of a plurality of the chucks to a face-plate. Fig. 6 is a view of the face-plate in edge elevation, showing the tire in section.

Heretofore in the operation of turning locomotive tires it has been customary to either turn the face of the tire without removal from the wheel itself, or to mount the tire on a supporting wheel in operative relation to the lathe in the manner of a face-plate. Such practice, however, involves the necessity of removal of the tire from the wheel, expanding it by heat, and then shrinking it on a wheel or temporary mandrel of the lathe, and then again expanding the tire by the application of heat for removal from the wheel after the turning operation.

Another method involves the use of holding clamps for fastening the tire against the face-plate and the use of set screws or wedges for tightening it thereon, or by using a separate mandrel which is clamped to the face-plate of the lathe and provided with a lip against which the face of the tire is held, using centering set screws and dogs and tapered keys in key-ways and wedges arranged on an incline adapted to bind against the inner face of the tire as it is being turned.

My invention has in view to overcome the necessity of such devices, rendering the tire free from any straining tending to distort it from its normal shape by utilizing my specially designed chucks adapted to positively grip the tire by its inner and outer side faces, leaving the face or flange entirely free for the turning operation, or by reversal of the chucks in the face-plate, adapting them for application to the tire for boring operations.

In the drawings, 2 represents the face-plate of a lathe or boring mill of well-known construction having a series of preferably equally spaced radially arranged slots or ways 3 for receiving and holding the chucks. Said ways may be of the usual T-shape for insertion of the holding bolts 4 by their heads 5, one bolt for each chuck being sufficient and having a tightening nut 6 at its outer end.

The chuck 7 is made in the form illustrated in the drawings, particularly Figs. 1, 2 and 3, having a flat base portion 8 with a central inwardly extending guiding key extension 9, adapted to slidingly interfit in the narrow portion of the keyway 3. At the end of the base 8, I provide a bolt hole 10 adapted to receive the bolt 4, by which the chuck is secured in place at any desired position.

Extending outwardly from the middle portion of the chuck is the supporting housing 11 terminating at its outer end in bearings 12, in which is mounted transversely the pivotal pin or bolt 13, preferably having a cotter pin or other suitable securing device 14 at one of its ends, permitting for easy removal of the pin. Each of the chucks is provided with an adjustable gripping jaw 15, the gripping face of which may be either plain, or serrated or toothed in any suitable manner, as indicated at 16, for positively engaging one of the side faces of the tire A. The jaw 15 is pivotally mounted on bolt 13 and is provided with a lever extension 17 of any suitable length to insure sufficient application of power.

The rear portion of housing 7 is reinforced, as indicated at 18, and internally threaded, as indicated at 19, for its full depth for reception of the adjusting bolt 20. Said bolt is provided at its upper portion with a bolt head 21, for application of a wrench, or otherwise suitably made for turning, as by a transverse opening, and the bolt is provided at its upper bearing with a rounded bearing terminal 22, adapted to bear against the inner face of the outer end of lever 17, or to engage a recess 23 therein. The bolt 20 is also provided with a lock nut 24 for fixedly securing it in place when adjusted.

The front portion of the chuck is provided with a bearing ledge or anvil portion 25, against the face 26 of which the inner face of the tire A may be placed in the case of larger size tires, in the manner indicated in dotted lines in Fig. 1.

For the purpose of providing a bearing for narrower tires, such as that shown in the drawings, I provide a supplemental bearing shoe 27, more clearly shown in Fig. 4. Said shoe is of sufficient thickness toward its middle portion to provide for setting up of the bearing face 28 upwardly above the face 26, when the shoe is applied, so as to provide a solid backing for the tire.

The shoe is provided at each end with downwardly turned lugs or extensions 29, 30, adapted to interfit between retaining ears or lugs 31, 31, at each end of the main bearing 26, and to thus fixedly hold the shoe 27 in alinement. One of the shoe lugs 29 is provided with a securing set screw 32, the inner end of which projects into a receiving cavity 33 in the corresponding side of the main supporting base 26, whereby to prevent accidental detachment or loosening of the shoe 27 in rotating the face-plate.

For the purpose of fixedly holding the tire A centrally in place on the face-plate, and with relation to the axial center of the lathe and plate, each chuck is provided with a set screw 34 extending through the housing 11 from the back, having a tightening lock nut 35 and a bearing terminal 36, against which the tire A seats at about its middle portion.

The operation of the device will be readily understood from the foregoing description.

In placing the tire in position for operation, the jaws 15 are first removed from each chuck by removal of the pivotal bolts 13, allowing the tire to be set in place, the set screws 34 having been fixed to operative position to support the tire at various points throughout its interior periphery, it being understood that the set screws may be fixedly set and retained in fixed position, requiring only slight adjustment at each operation, for any number of standard size tires. The tire is then set backwardly against the shoes 27, or face 26 as the case may be, and the jaws 15 and bearing pins are then replaced in position. The bolts 20 are then tightened outwardly against the lever 17 with sufficient pressure to insure tight gripping engagement of the jaws all around, the bolts being locked by the lock nuts 24, when the device is ready for use.

While I have shown the gripping jaws 15 as serrated or toothed and the face 28 of the dog 27 and face 26 of the bearing base 25 as smooth, it will, of course, be understood that these conditions may be reversed, or that the jaws and co-acting bearing faces of the shoe or base may be both serrated or both smooth, depending upon the character of the work to be done.

In using the invention for boring, the chucks may be all removed outwardly through the radial slots and reversed in position, facing the chucks inwardly toward the center of the face-plate, permitting the tire to be set and secured in the same general manner, in placing its inner face for boring.

While the device is adjustable accurately to any position on the face-plate, it will be understood that all of the chucks may be originally set and maintained in position for treatment of any number of uniform size tires. All of the parts are so made as to avoid loosening or displacement when the chuck is empty or rotated without the tire. If desired, filler blocks or spacers may be inserted between the inner end of each chuck and the inner end of its receiving slot in the face-plate, as indicated at 37, whereby to facilitate positioning and holding of the chucks in fixed relation to the face-plate.

The advantages of the invention will be readily appreciated by those familiar with this class of apparatus. It provides for receiving and holding the tire in its original shape, prevents any straining or springing of the tire, insures its quick and easy adjustment and removal with relation to the face-plate, and effects a great economy in the time of operation.

While I have shown the face-plate as provided with eight radial slots, it will be understood that the invention is not limited to any particular number, and that a portion only of the chucks may be used, as desired. The chucks are applicable to face-plates of any standard design and may be readily removed for substitution of other chucks for different work, if desired.

The invention may be changed or varied in different details of construction or design by the skilled mechanic, but all such changes are to be considered as within the scope of the following claims.

What I claim is:

1. A chuck consisting of a housing having means for locating and securing it to a face-plate, an outer hinge bearing having a pivoting bolt, and an inner bearing face, an outer lever fulcrumed on the pivoting bolt having a gripping jaw, and means incorporated with the housing for adjusting said lever and jaw with relation to said bearing face, substantially as set forth.

2. A chuck consisting of a housing having means for locating and securing it to a face-plate, an inner bearing face, an outer pivoted jaw having a lever extension, and an adjusting screw mounted in the housing and adapted to bear against said lever, substantially as set forth.

3. A chuck consisting of a housing having means for locating and securing it to a face-plate and an inner bearing face, an outer pivoted jaw having a lever extension, an adjusting screw mounted in the housing provided with a tightening lock nut and adapted to bear against said lever, and an additional adjusting screw in the housing for the article being treated, substantially as set forth.

4. In a chuck, the combination with a housing having an adjustable gripping jaw and means for exerting clamping pressure therethrough; of a removable bearing shoe on the housing adapted to be set in operative relation with said jaw and provided with a securing device for holding it in position, substantially as set forth.

5. A chuck consisting of a housing having means for locating and securing it to a face-plate, an inner bearing face, an outer pivoted jaw, means for adjusting said jaw with relation to said bearing, and a centralizing set screw adapted to provide a bearing for the face of the material being treated, substantially as set forth.

6. The combination with a face-plate of a lathe or boring mill having a plurality of radial slots, of a plurality of gripping chucks mounted in said slots, each having a bearing face for the inner face of a tire and an adjustable lever fulcrumed in the housing having a gripping jaw adapted to grip against the outer face of the tire, and means incorporated with the housing for adjusting said lever and jaw, substantially as set forth.

7. The combination with a face-plate, of a plurality of chucks thereon, each having a bearing face for the inner face of a tire, a fulcrum bearing, and an adjustable lever and gripping jaw pivotally mounted in said fulcrum bearing adapted to engage the opposite outer face of a tire, and mechanism incorporated in each chuck for adjusting said lever and jaw, substantially as set forth.

In testimony whereof I hereunto affix my signature in the presence of two witnesses.

AUSTON H. REAM.

Witnesses:
C. M. CLARKE,
FREDK. STAUB.

---

Copies of this patent may be obtained for five cents each, by addressing the "Commissioner of Patents, Washington, D. C."